United States Patent
Mitta

(10) Patent No.: US 12,065,373 B2
(45) Date of Patent: Aug. 20, 2024

(54) ELONGATING METHOD AND ELONGATING APPARATUS FOR GLASS BASE MATERIAL

(71) Applicant: Shin-Etsu Chemical Co., Ltd., Tokyo (JP)

(72) Inventor: Ryo Mitta, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 104 days.

(21) Appl. No.: 17/578,418

(22) Filed: Jan. 18, 2022

(65) Prior Publication Data

US 2022/0242772 A1 Aug. 4, 2022

(30) Foreign Application Priority Data

Jan. 29, 2021 (JP) ................................ 2021-013015

(51) Int. Cl.
*C03B 23/037* (2006.01)
(52) U.S. Cl.
CPC .................... *C03B 23/037* (2013.01)
(58) Field of Classification Search
None
See application file for complete search history.

(56) References Cited

U.S. PATENT DOCUMENTS

| | | | | | |
|---|---|---|---|---|---|
| 5,674,306 | A | * | 10/1997 | Hoshino | ........... C03B 37/02736 65/435 |
| 5,675,306 | A | * | 10/1997 | Diaz | ....................... H01F 38/08 336/178 |
| 5,755,849 | A | * | 5/1998 | Hoshino | ............... C03B 23/047 65/435 |
| 2014/0020430 | A1 | | 1/2014 | Otosaka | |

FOREIGN PATENT DOCUMENTS

JP 5766157 B2 8/2015

* cited by examiner

*Primary Examiner* — Lisa L Herring

(57) ABSTRACT

Provided is an elongating method for elongating a glass base material by heating the same while moving the same downward within an elongating apparatus, the glass base material including a transparent tapered section, wherein the transparent tapered section is located at an upper end of the glass base material and has an end face to which a suspension dummy formed from a glass pole is welded, the elongating method comprising steps for: starting to elongate the glass base material by heating the same, starting from a lower-end side thereof, by causing the glass base material to pass through a range within the elongating apparatus in which a preset elongating process temperature or higher is maintained; and after the tapered section enters the range, ending the elongating of the glass base material before the end face enters the range.

9 Claims, 2 Drawing Sheets

ELONGATING METHOD AND ELONGATING APPARATUS FOR GLASS BASE MATERIAL

The contents of the following Japanese patent application(s) are incorporated herein by reference:
NO. 2021-013015 filed in JP on Jan. 29, 2021

BACKGROUND

1. Technical Field

The present invention relates to an elongating method and an elongating apparatus for a glass base material.

2. Related Art

Patent document 1 describes "a method suitable for elongating a glass base material having a large diameter so as to fabricate glass rods having a smaller diameter, wherein a glass base material that includes a body section having one end at which a transparent tapered glass section is provided and another end at which a tapered glass section including an opaque glass section is provided is elongated in a manner such that, prior to the elongation, a suspension dummy is welded to the leading end of the transparent tapered glass section, the suspension dummy is coupled to a sending mechanism, and the glass base material is inserted for elongation into a heating furnace starting from the lower portion of the glass base material, thereby matching the axial core of the body section of the glass base material with the axial core of the suspension dummy" (paragraph [0021]).

PRIOR ART DOCUMENT

Patent Document

Patent Document 1: Japanese Patent No. 5766157

DESCRIPTION OF EXEMPLARY EMBODIMENTS

The following describes the present invention by referring to embodiments thereof. However, the embodiments described hereinafter do not limit the invention as in the claims. Not all of the combinations of features described in the embodiments are necessarily essential for the solution of the invention.

Figure 1:
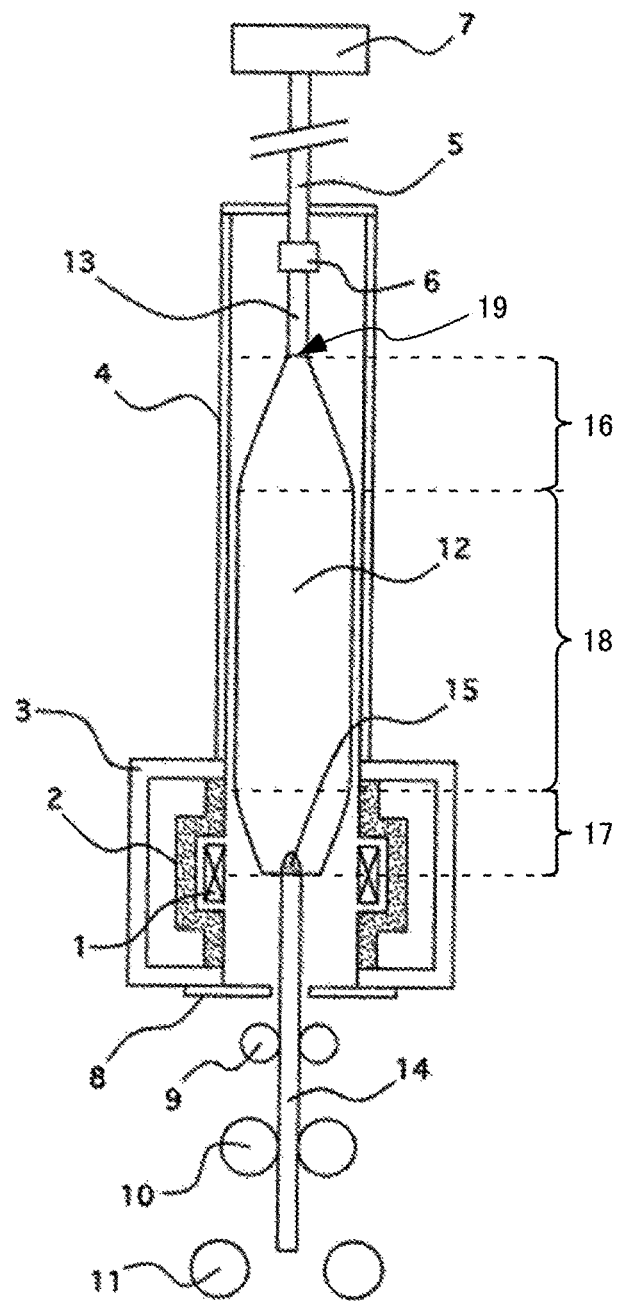
FIG. 1 is a schematic vertical cross-sectional view showing an example of an elongating apparatus 100.

FIG. 1 is a schematic vertical cross-sectional view showing an example of an elongating apparatus 100. The elongating apparatus 100 elongates a glass base material 12 by heating the glass base material 12 while the glass base material 12 is moving downward within the elongating apparatus 100. The elongating apparatus 100 produces glass rods having a smaller diameter than the glass base material 12 by elongating the glass base material 12. The elongating apparatus 100 according to the present embodiment includes a heater 1, a heat insulation material 2, a water-cooling chamber 3, a top chamber 4, a suspension shaft 5, a connection jig 6, a sending mechanism 7, a lower gas seal 8, guide rollers 9, pulling rollers (upper pulling rollers) 10, and pulling rollers (lower pulling rollers) 11.

For example, the glass base material 12 may contain quartz glass. The glass base material 12 containing quartz glass is elongated by the elongating apparatus 100 so as to be formed as a quartz glass rod such as one typified by an optical fiber preform. An elongating process temperature for the glass base material 12 containing quartz glass is, for example, 1900° C.

The glass base material 12 has a pillar shape, e.g., substantially has a circular cylinder shape. The following description is based on the assumption that the glass base material 12 is set within the elongating apparatus 100. One end of the glass base material 12 located on the upper side of the elongating apparatus 100 may hereinafter be referred to as an upper end, and another end of the glass base material 12 located on the lower side of the elongating apparatus 100 may hereinafter be referred to as a lower end.

The glass base material 12 includes a first tapered section 16 that is transparent and located at the upper end, a second tapered section 17 that is located at the lower end, and a body section 18 that is located between the first tapered section 16 and the second tapered section 17.

The first tapered section 16 is tapered toward the upper end of the glass base material 12. The first tapered section 16 includes, on the tapered side, an end face 19 which is a cut face formed by cutting the base material. A suspension dummy 13 formed from a glass pole is welded in advance to the end face 19 of the first tapered section 16.

The second tapered section 17 is tapered toward the lower end of the glass base material 12. The second tapered section 17 includes, on the tapered side, a cut face formed by cutting the base material. As an example, the glass base material 12 may be fabricated from a porous glass base material. Thus, the second tapered section 17 includes an opaque section 15 on the cut-face side. As an example, the body section 18 may have a substantially constant outer diameter between the connecting portion connected to the first tapered section 16 and the connecting portion connected to the second tapered section 17.

The abovementioned opaque section 15 may be a portion of a porous glass base material that is intentionally maintained to prevent the second tapered section 17 from being excessively elongated in a process of forming the glass base material 12 by sintering the porous glass base material to provide transparent glass. More specifically, in this process, the porous glass base material, which is vertically suspended, is sintered starting from the lower portion of the porous glass base material with the second tapered section 17 being located on the upper side, so if an attempt was made to turn the porous glass base material, including the tapered leading end of the second tapered section 17, completely into transparent glass, the overall weight of an already vitrified ingot would be received by the leading end, thereby excessively elongating the second tapered section 17. In order to prevent the second tapered section 17 from being excessively elongated, the leading-end side of the second tapered section 17 may be intentionally incompletely turned into transparent glass, with the result that the opaque section 15 may be maintained in the second tapered section 17.

With respect to respective components of the elongating apparatus 100, the heater 1, the heat insulation material 2, the water-cooling chamber 3, the top chamber 4, and the lower gas seal 8 may hereinafter be collectively referred to as a heating furnace. The suspension shaft 5, the connection jig 6, and the sending mechanism 7 may hereinafter be collectively referred to as a sending part. The guide rollers 9, the pulling rollers (upper pulling rollers) 10, and the pulling rollers (lower pulling rollers) 11 may hereinafter be collectively referred to as a pulling part.

The heater 1 heats the inside of the elongating apparatus 100, in particular, heats at least the area around the heater 1 to a preset elongating process temperature or higher, e.g., a temperature equal to or higher than 1900° C., which is the elongating process temperature for quartz glass. The heat insulation material 2 is disposed to enclose the heater 1. The water-cooling chamber 3 is formed to enclose the heat insulation material 2. Cooling water flows through the water-cooling chamber 3. The top chamber 4 is coupled to the upper portion of the water-cooling chamber 3 and forms a housing for the elongating apparatus 100 together with the heater 1, the heat insulation material 2, and the water-cooling chamber 3. The lower gas seal 8 is an openable seal attached to the lower portion of the water-cooling chamber 3.

The sending mechanism 7 is attached to the upper portion of the heating furnace and can move the suspension shaft 5, which is suspended on the sending mechanism 7, in an up-down direction. The suspension shaft 5 can be inserted into and withdrawn from the top chamber 4. The upper side of the connection jig 6 is fixed to a leading end of the suspension shaft 5 that is located within the top chamber 4. A member, e.g., the suspension dummy 13, can be mechanically connected to the lower side of the connection jig 6.

The guide rollers 9, the pulling rollers (upper pulling rollers) 10, and the pulling rollers (lower pulling rollers) 11 are a plurality of rollers provided below the heating furnace, and can hold and release a member located between the plurality of rollers, respectively. The guide rollers 9 are formed from heat-resistant rollers of, for example, carbon and serve to guide a member held between these rollers to the axial core of the elongating apparatus 100. The pulling rollers (upper pulling rollers) 10 and the pulling rollers (lower pulling rollers) 11 are driven by a motor and serve to pull down a member held between these rollers so as to elongate the same.

In an elongating method implemented by the elongating apparatus 100 according to the present embodiment, before the glass base material 12 starts to be elongated, the upper end of the suspension dummy 13 welded to the end face 19 of the first tapered section 16 is mechanically connected to the connection jig 6. In this way, the glass base material 12 is coupled to the sending mechanism 7 via the suspension shaft 5 and can move in the up-down direction within the elongating apparatus 100. In addition, the sending mechanism 7 moves the glass base material 12, and the cut face of the second tapered section 17 is located in the vicinity of the heater 1. Furthermore, the guide rollers 9 and the pulling rollers (upper pulling rollers) 10 insert a pulling dummy 14 into the elongating apparatus 100 from below the elongating apparatus 100 while matching the pulling dummy 14 with the axial core of the elongating apparatus 100. Then, while the upper end of the pulling dummy 14 abuts the cut face of the second tapered section 17, the site of abutment is welded with heat from the heater 1.

FIG. 1 shows an example of the state after the preprocessing described so far, i.e., an example of the state before starting elongation of the glass base material 12. In the elongating method implemented by the elongating apparatus 100 according to the present embodiment, the glass base material 12 starts to be heated and elongated, starting from the lower-end side of the glass base material 12, by being caused to pass through a range within the elongating apparatus 100 in which the preset elongating process temperature or higher is maintained.

In the elongating method, specifically, the temperature of the area around the heater 1 is increased to 1900° C. or higher, with the lower side of the second tapered section 17 shown in FIG. 1 being located in the vicinity of the heater 1. Preferably, the temperature of the heater 1 is increased like this without the pulling dummy 14 being located in the vicinity of the heater 1. In response to the temperature of the area around the heater 1 reaching 1900° C. or higher, while the sending mechanism 7 sends out the suspension dummy 13, at least either the pulling rollers (upper pulling rollers) 10 or the pulling rollers (lower pulling rollers) 11 start to pull the pulling dummy 14 downward at a rate higher than the send-out rate of the sending mechanism 7. Thus, the glass base material 12 starts to be elongated starting from the lower-end side. Note that the abovementioned range is, for example, a range in the vicinity of the heater 1 in which the temperature of 1900° C. or higher is maintained.

In the elongating method implemented by the elongating apparatus 100 according to the present embodiment, after the first tapered section 16 of the glass base material 12 enters the range, the elongating of the glass base material 12 ends before the end face 19 of the first tapered section 16 enters the range.

If a characteristic-effective-section end of the glass base material 12, i.e., a portion of a glass rod to be produced from the glass base material 12 that corresponds to an end of the range to be used as a product, is excessively close to the end face 19 of the first tapered section 16, attempting to elongate the glass base material 12 to the effective-section end could cause the suspension dummy 13 and the portion of the first tapered section 16 in the vicinity of the end face 19 to be deformed due to heat before the effective-section end is deformed.

Minute air bubbles and the like often remain in the portion of the end face 19 of the first tapered section 16 to which the suspension dummy 13 is welded. This portion tends to be deformed in comparison with portions around this portion. For cost reduction, the suspension dummy 13 is often formed from a glass pole having a smaller outer diameter than the end face 19 of the first tapered section 16. For these reasons, the abovementioned deformation could occur when the portion of the first tapered section 16 in the vicinity of the end face 19 receives a load while being heated to a temperature equal to or higher than 1900° C., i.e., the process temperature for quartz glass, within the elongating apparatus. As a result, the suspension dummy 13 or the portion of the first tapered section 16 in the vicinity of the end face 19 could rupture, thereby causing the glass base material 12 to fall within the elongating apparatus. If there is heat deformation in a portion of the first tapered section 16 in the vicinity of the end face 19, a glass rod with a large amount of curvature and large variations in outer diameter may be produced.

By contrast, in the elongating method implemented by the elongating apparatus 100 according to the present embodiment, after the first tapered section 16 of the glass base material 12 enters the abovementioned range, the elongating of the glass base material 12 ends before the end face 19 of the first tapered section 16 enters the range. For example, the elongating apparatus 100 may perform control such that the range is located vertically below the end face 19 of the first tapered section 16 at a time point at which the sending mechanism 7 and the like finish sending the glass base material 12 into the elongating apparatus 100.

The elongating method allows for suppression of heat deformation of the suspension dummy 13 and the portion of the first tapered section 16 in the vicinity of the end face 19. Thus, the elongating method can prevent the suspension dummy 13 or the portion of the first tapered section 16 in the vicinity of the end face 19 from rupturing, so the glass base material 12 will not fall within the elongating apparatus 100. The elongating method suppresses heat deformation of the portion of the first tapered section 16 in the vicinity of the end face 19, so that a glass rod with a small amount of curvature and small variations in outer diameter can be produced. The elongating method prevents the glass base material 12 from falling, and enhances the probability of production of glass rods with an amount of curvature and variations in outer diameter that fall within allowable ranges required for products. Hence, the yields of the glass rods are improved, thereby decreasing the fabrication cost.

In the elongating method, as a specific example, the elongating of the glass base material 12 may end to satisfy $(X/2)<Y<\{(X/2)+Z\}$, where X is the length of the above-mentioned range in the up-down direction of the elongating apparatus 100 [mm], Y is the length of an area extending from the central position in the range in the up-down direction to the end face 19 [mm], and Z is the length of the first tapered section 16 in the up-down direction [mm].

According to an example of the elongating method, it can be said that: the glass base material 12 is sent into the heating furnace of the elongating apparatus 100, which has been heated to a prescribed elongating process temperature; and when glass rods elongated to have a prescribed diameter are successively received from the lower portion of the elongating apparatus 100, the elongating continues while an apparatus vertical-direction length Y (mm) extending from the center of the heater 1 to the end of the glass base material 12 connected to the suspension dummy 13 does not become less than ½ of an apparatus vertical-direction length X (mm) of a portion of the inside of the heating furnace at which the prescribed elongating process temperature is maintained, and the elongating ends when the X/2 is less than Y (mm).

Figure 2:
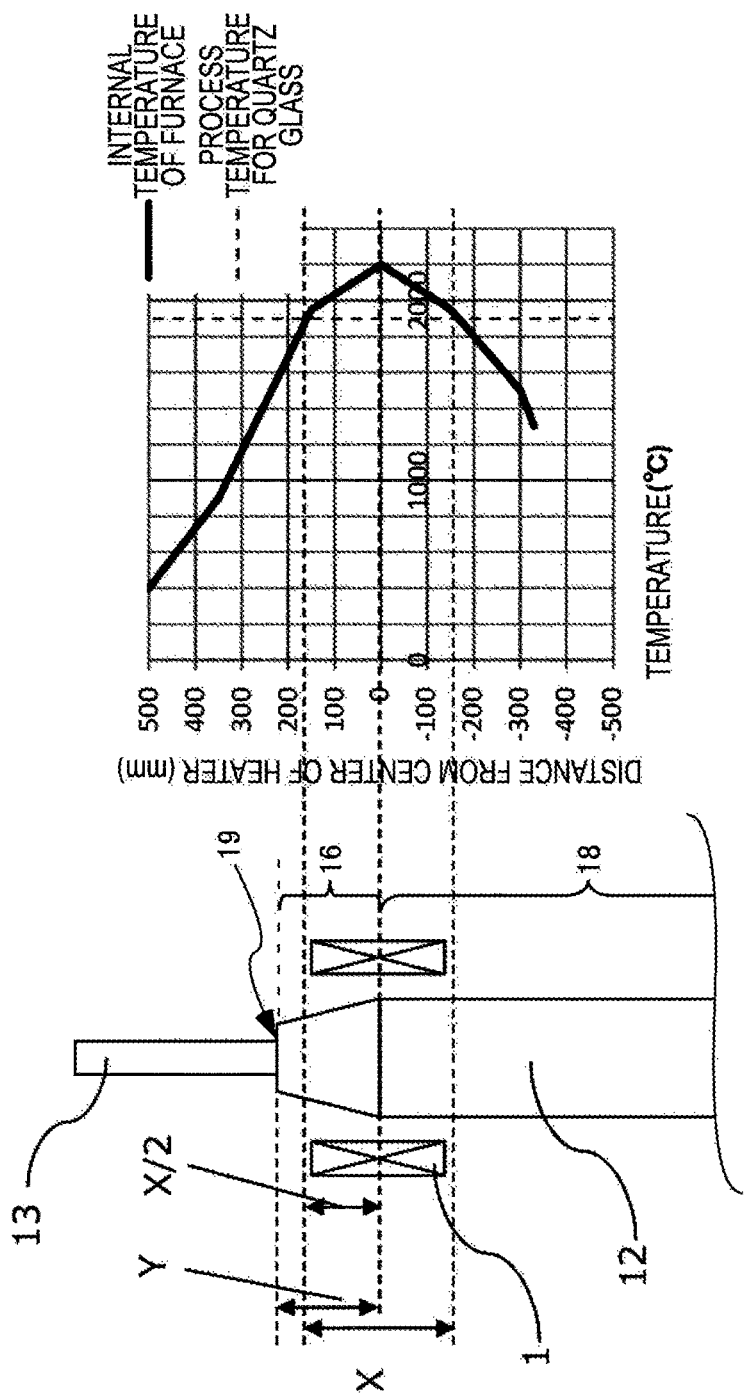
FIG. 2 is a schematic view showing a relationship achieved between temperatures and the position of a first tapered section 16 at the upper end of a glass base material 12 when the glass base material 12 arrives at an elongation end position.

FIG. 2 is a schematic view showing a relationship achieved between temperatures and the position of the first tapered section 16 at the upper end of the glass base material 12 when the glass base material 12 arrives at an elongation end position. In FIG. 2, the vertical axis of the graph on the right indicates a distance (mm) from the center of the heater 1 in the up-down direction, with the position of the center of the heater 1 as 0; and the horizontal axis indicates the internal temperature (° C.) of the furnace, i.e., the temperature (° C.) of the inside of the elongating apparatus 100. The curve indicated using a solid line in the figure represents the distribution of the internal temperature of the furnace, in which a maximum temperature is provided at the position of the center of the heater 1.

In FIG. 2, the apparatus vertical-direction length Y (mm) that extends from the center of the heater 1 to the end of the suspension dummy 13 connected to the first tapered section 16 of the glass base material 12 is found to be greater than ½ of the apparatus vertical-direction length X (mm) of the portion of the inside of the heating furnace at which a temperature equal to or higher than 1900° C., i.e., the process temperature for quartz glass, is maintained.

During the elongating process, accordingly, the end of the suspension dummy 13 connected to the first tapered section 16 of the glass base material 12 always stays within a temperature range that is less than 1900° C., i.e., the process temperature for quartz glass, thereby preventing unintentional deformation of the portion of the suspension dummy 13 in the vicinity of the connection end, and also preventing large variations in the diameters of product portions and fall of the product portions, both of which could occur in association with the unintentional deformation. Hence, glass rods with a preferable shape can be safely provided.

In the embodiments described so far, as an example, the outer diameter of the body section 18 of the glass base material 12 may preferably be greater than 80 mm, which is the outer diameter of common optical fiber preforms. The elongating apparatus 100 may use a glass base material 12 that includes a body section 18 having an outer diameter greater than 80 mm, thereby enhancing a capacity utilization rate in comparison with elongating apparatuses for the common optical fiber preforms.

A glass lathe constituted by an elongating apparatus that uses a burner as a heat source is a comparative example to be compared with the elongating apparatus 100. For example, when the glass lathe uses a glass base material 12 that includes a body section 18 having an outer diameter of about 150 mm, it may be difficult to correct a curve in a glass rod produced from the glass base material 12. This may result from the following: heating is performed by the burner of the glass lathe in an open atmosphere, so cooling associated with radiation occurs concurrently with the heating; the larger the outer diameter is, the larger the effect of the cooling associated with radiation is, and the temperature cannot be sufficiently increased; and in addition, it is difficult to remove a distortion remaining at a position of curve correction.

In the elongating apparatus 100, by contrast, as described above, the suspension dummy 13 is welded to the end face 19, i.e., a cut face of the transparent first tapered section 16, and then the glass base material 12 is elongated to match the axial core of the glass base material 12 with the center of the elongating apparatus 100. Afterward, the elongating apparatus 100 performs the abovementioned elongating method. In this way, even when a glass base material 12 that includes a body section 18 having an outer diameter of about 150 mm is used, the elongating apparatus 100 can provide a glass rod with a small amount of curvature, e.g., a glass rod with an amount of curvature of 2 mm/m or less or with an amount of curvature close to 2 mm/m.

In the embodiments described above, $D2 \leq D1 < 140$ is preferably satisfied, where D1 is the outer diameter of the end face 19 [mm], and D2 is the outer diameter of the suspension dummy 13 on the end-face-19 side [mm]. Specifically, the outer diameter of the cut face of the glass base material 12, i.e., the outer diameter of the end face 19, is equal to or larger than the outer diameter of the suspension dummy on the end-face-19 side. The outer diameter of the end face 19 of the glass base material 12 is preferably equal to or less than 140 mm. When the outer diameter of the end face 19 of a glass base material 12 is larger than 140 mm, a site in the first tapered section 16 in the vicinity of the end face 19, which is welded to the suspension dummy 13, could be insufficiently heated, and a distortion could be produced in this site. A crack could occur in the site with a distortion. When a crack occurs in a glass rod produced by elongating a glass base material 12 with the elongating apparatus 100, the burden on an operator removing the glass rod from the elongating apparatus 100 will increase.

In the embodiments described above, the outer diameter of the suspension dummy 13 on the end-face-19 side preferably is 30 mm or more and 60 mm or less. If the outer diameter of the suspension dummy 13 is less than 30 mm, a crack may be made from a minute flaw due to a load upon elongation or ambient heat, or a product may be incapable of being supported and thus become unstable in the setting process before elongation or the removing process after elongation. Meanwhile, a suspension dummy 13 having an outer diameter greater than 60 mm is not preferable, because of an increase in the unit price of the suspension dummy 13, leading to a problem with cost.

The following describes the present invention in more detail by referring to examples and comparative examples. However, the present invention is not limited to these examples at all.

EXAMPLES

Elongations were performed with an elongation target diameter of 150 mm by using a glass base material that includes a body section having a length of 2200 mm and an outer diameter of 190 mm, and tapered sections located at both ends of the glass base material and having a length of 500 mm. The glass base material was fabricated by sintering a porous glass base material provided by depositing, by using an OVD method, glass particles on a target, the target being provided by connecting dummy rods to both ends of a core member having a refractive index adjusted for a single-mode optical fiber. The glass base material includes one end at which a transparent tapered glass section is provided, and another end at which a tapered section including an opaque glass section is provided. The tapered section including the opaque glass section was provided by cutting the glass base material at a position displaced from the joint between the core rod of the glass base material and the dummy rod toward the dummy rod by 170 mm. The transparent-tapered-glass-section side was cut at a position at which the outer diameter of the leading end is 110 mm. A suspension dummy having an outer diameter of 40 mm was welded to the cut face by using a glass lathe.

The elongating apparatus shown in FIG. 1 was used, and a top chamber 4 formed from quartz glass was used. The glass base material was set such that the transparent-tapered-glass-section side was located on the upper side, and the side on which the tapered glass section including the opaque glass section is provided was located on the lower side, and the lower end of the glass base material was located at the same height as the center of the heater. A room temperature was increased at 40° C./min up to 2100° C., and then elongation was performed after a pulling dummy was welded.

With respect to the elongating apparatus, the distribution of the internal temperature of the furnace was measured, with the temperature increased when no preform was present by using an OMEGA (registered trademark) ultrahigh-temperature thermocouple probe. The result was that the apparatus vertical-direction length of the portion of the inside of the furnace at which a temperature of 1900° C. or higher is maintained was X=340 mm. A distance Y between the position of the welded end of the suspension dummy and the position of the center of the heater was variously changed when the elongating of the aforementioned glass base material ended, so as to perform elongations based on the following comparative examples 1-3 and examples 1-3. The following are detailed conditions.

Comparative Example 1: Under the condition of X/2=170 mm, which is half the apparatus vertical-direction length of a portion of the inside of the furnace at which a temperature of 1900° C. or higher is maintained, the aforementioned glass base material was elongated, and the elongating was ended when the distance Y between the position of the welded end of the suspension dummy and the position of the center of the heater came to satisfy Y=150 mm.

Comparative Example 2: Under the condition of X/2=170 mm, which is half the apparatus vertical-direction length of a portion of the inside of the furnace at which a temperature of 1900° C. or higher is maintained, the aforementioned glass base material was elongated, and the elongating was ended when the distance Y between the position of the welded end of the suspension dummy and the position of the center of the heater came to satisfy Y=160 mm.

Comparative Example 3: Under the condition of X/2=170 mm, which is half the apparatus vertical-direction length of a portion of the inside of the furnace at which a temperature of 1900° C. or higher is maintained, the aforementioned glass base material was elongated, and the elongating was ended when the distance Y between the position of the welded end of the suspension dummy and the position of the center of the heater came to satisfy Y=170 mm.

Example 1: Under the condition of X/2=170 mm, which is half the apparatus vertical-direction length of a portion of the inside of the furnace at which a temperature of 1900° C. or higher is maintained, the aforementioned glass base material was elongated, and the elongating was ended when the distance Y between the position of the welded end of the suspension dummy and the position of the center of the heater came to satisfy Y=180 mm.

Example 2: Under the condition of X/2=170 mm, which is half the apparatus vertical-direction length of a portion of the inside of the furnace at which a temperature of 1900° C. or higher is maintained, the aforementioned glass base material was elongated, and the elongating was ended when the distance Y between the position of the welded end of the suspension dummy and the position of the center of the heater came to satisfy Y=190 mm.

Example 3: Under the condition of X/2=170 mm, which is half the apparatus vertical-direction length of a portion of the inside of the furnace at which a temperature of 1900° C. or higher is maintained, the aforementioned glass base material was elongated, and the elongating was ended when the distance Y between the position of the welded end of the suspension dummy and the position of the center of the heater came to satisfy Y=200 mm.

In each of the comparative examples 1-3 and examples 1-3 described above, three glass base materials were elongated, and variations in the outer diameter of product portions after elongation and the stability of the removing process after elongation were evaluated. Table 1 indicates the results. In table 1, symbol "○ (circle)" means "good," and symbol "x (cross)" means "problematic".

TABLE 1

|  | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 |
|---|---|---|---|---|---|---|
| HALF OF APPARATUS VERTICAL-DIRECTION LENGTH OF A PORTION OF INSIDE OF FURNACE AT WHICH TEMPERATURE OF 1900° C. OR HIGHER IS MAINTAINED = X/2 (mm) | 170 | 170 | 170 | 170 | 170 | 170 |
| DISTANCE PROVIDED WHEN ELONGATION ENDS BETWEEN POSITION OF WELDED END OF SUSPENSION DUMMY AND POSITION OF CENTER OF HEATER = Y (mm) | 150 | 160 | 170 | 180 | 190 | 200 |
| EVALUATION OF SHAPE OF PRODUCT PORTIONS AFTER ELONGATION | X | X | X | ○ | ○ | ○ |

In each of comparative examples 1-3, the welded end of the suspension dummy was heated when the elongation ended, thereby exhibiting an unintentional large deformation; and the outer diameters of product portions were −1.9 mm to +2.7 mm in comparison with the target elongation diameter, i.e., a large amount of outer diameter variation was observed, and large amounts of curvature of 2.7 mm/m to 3.8 mm/m were also observed.

In each of examples 1-3, the welded end of the suspension dummy was not deformed when the elongation ended; and the outer diameters of product portions were −0.2 mm to +0.7 mm in comparison with the target elongation diameter, i.e., a small amount of outer diameter variation was observed, and small amounts of curvature of 0.4 mm/m to 1.3 mm/m were also observed.

Accordingly, it is found that the distance Y between the position of the welded end of the suspension dummy and the position of the center of the heater when the elongation ends should be 180 mm or greater when X/2 is 170 mm, where X/2 is the numerical value obtained by dividing, by two, the apparatus vertical-direction length X of the portion of the inside of the furnace at which a temperature of 1900° C. or higher is maintained. In other words, X/2<Y should be satisfied.

Next, the outer diameter of the cut face at a site of the glass base material which is located on the transparent-tapered-glass-section side and to which the suspension dummy is welded and the outer diameter of the suspension dummy welded to the cut face were variously changed so as to perform elongations based on the following examples 4-14.

The glass base material is one fabricated similarly to that used in the above comparative examples and examples and includes a body section having a length of 2200 mm and an outer diameter of 190 mm, and tapered sections located at both ends of the glass base material and having a length of 500 mm. Elongations were performed with an elongation target diameter of 150 mm.

The glass base material was set such that the transparent-tapered-glass-section side was located on the upper side, and the lower end of the glass base material was located at the same height as the center of the heater. A room temperature was increased at 40° C./min up to 2100° C., and then elongation was performed after a pulling dummy was welded. Note that the tapered section including the opaque glass section was provided by cutting the glass base material at a position displaced from the joint between the core rod of the glass base material and the dummy rod toward the dummy rod by 170 mm.

With respect to the elongating apparatus, the distribution of the internal temperature of the furnace was measured, with the temperature increased when no preform was present by using an OMEGA (registered trademark) ultrahigh-temperature thermocouple probe. The result was that the apparatus vertical-direction length of a portion of the inside of the furnace at which a temperature of 1900° C. or higher is maintained was X=340 mm (X/2=170 mm).

In the following examples 4-14, elongation was ended at an elongation end position at which the distance Y between the position of the welded end of the suspension dummy and the position of the center of the heater satisfied Y=180 mm. The following are detailed conditions.

Example 4: The transparent-tapered-glass-section side of the glass base material was cut at a position at which the outer diameter of the leading end of the glass base material was 95 mm. Elongation was performed after setting, on the elongating apparatus, the glass base material, which had the cut face with a suspension dummy having an outer diameter of 40 mm welded thereto by using a glass lathe.

Example 5: The transparent-tapered-glass-section side of the glass base material was cut at a position at which the outer diameter of the leading end of the glass base material was 110 mm. Elongation was performed after setting, on the elongating apparatus, the glass base material, which had the cut face with a suspension dummy having an outer diameter of 40 mm welded thereto by using a glass lathe.

Example 6: The transparent-tapered-glass-section side of the glass base material was cut at a position at which the outer diameter of the leading end of the glass base material was 125 mm. Elongation was performed after setting, on the elongating apparatus, the glass base material, which had the cut face with a suspension dummy having an outer diameter of 40 mm welded thereto by using a glass lathe.

Example 7: The transparent-tapered-glass-section side of the glass base material was cut at a position at which the outer diameter of the leading end of the glass base material was 140 mm. Elongation was performed after setting, on the elongating apparatus, the glass base material, which had the cut face with a suspension dummy having an outer diameter of 40 mm welded thereto by using a glass lathe.

Example 8: The transparent-tapered-glass-section side of the glass base material was cut at a position at which the outer diameter of the leading end of the glass base material was 150 mm. Elongation was performed after setting, on the elongating apparatus, the glass base material, which had the cut face with a suspension dummy having an outer diameter of 40 mm welded thereto by using a glass lathe.

Example 9: The transparent-tapered-glass-section side of the glass base material was cut at a position at which the outer diameter of the leading end of the glass base material was 110 mm. Elongation was performed after setting, on the elongating apparatus, the glass base material, which had the cut face with a suspension dummy having an outer diameter of 20 mm welded thereto by using a glass lathe.

Example 10: The transparent-tapered-glass-section side of the glass base material was cut at a position at which the In each of the examples 4-14 described above, one glass base material was elongated, and variations in the outer diameter of product portions after elongation and the stability of the removing process after elongation were evaluated. Table 2 indicates the results. In table 2, symbol "○ (circle)" means "good," and symbol "Δ (triangle)" means "need improvement".

TABLE 2

|  | EXAMPLE 4 | EXAMPLE 5 | EXAMPLE 6 | EXAMPLE 7 | EXAMPLE 8 | EXAMPLE 9 |
|---|---|---|---|---|---|---|
| OUTER DIAMETER OF CUT FACE OF TRANSPARENT TAPERED GLASS SECTION (mm) | 95 | 110 | 125 | 140 | 150 | 110 |
| OUTER DIAMETER OF SUSPENSION DUMMY (mm) | 40 | 40 | 40 | 40 | 40 | 20 |
| EVALUATION OF SHAPE OF PRODUCT PORTIONS AFTER ELONGATION | ○ | ○ | ○ | ○ | ○ | ○ |
| EVALUATION OF STABILITY OF REMOVING OF PRODUCT AFTER ELONGATION | ○ | ○ | ○ | ○ | Δ | Δ |
| COST EVALUATION | ○ | ○ | ○ | ○ | ○ | ○ |
| COMPREHENSIVE EVALUATION | ○ | ○ | ○ | ○ | Δ | Δ |

|  | EXAMPLE 10 | EXAMPLE 11 | EXAMPLE 12 | EXAMPLE 13 | EXAMPLE 14 |
|---|---|---|---|---|---|
| OUTER DIAMETER OF CUT FACE OF TRANSPARENT TAPERED GLASS SECTION (mm) | 110 | 110 | 110 | 110 | 110 |
| OUTER DIAMETER OF SUSPENSION DUMMY (mm) | 30 | 40 | 50 | 60 | 70 |
| EVALUATION OF SHAPE OF PRODUCT PORTIONS AFTER ELONGATION | ○ | ○ | ○ | ○ | ○ |
| EVALUATION OF STABILITY OF REMOVING OF PRODUCT AFTER ELONGATION | ○ | ○ | ○ | ○ | ○ |
| COST EVALUATION | ○ | ○ | ○ | ○ | Δ |
| COMPREHENSIVE EVALUATION | ○ | ○ | ○ | ○ | Δ | outer diameter of the leading end of the glass base material was 110 mm. Elongation was performed after setting, on the elongating apparatus, the glass base material, which had the cut face with a suspension dummy having an outer diameter of 30 mm welded thereto by using a glass lathe.

Example 11: The transparent-tapered-glass-section side of the glass base material was cut at a position at which the outer diameter of the leading end of the glass base material was 110 mm. Elongation was performed after setting, on the elongating apparatus, the glass base material, which had the cut face with a suspension dummy having an outer diameter of 40 mm welded thereto by using a glass lathe.

Example 12: The transparent-tapered-glass-section side of the glass base material was cut at a position at which the outer diameter of the leading end of the glass base material was 110 mm. Elongation was performed after setting, on the elongating apparatus, the glass base material, which had the cut face with a suspension dummy having an outer diameter of 50 mm welded thereto by using a glass lathe.

Example 13: The transparent-tapered-glass-section side of the glass base material was cut at a position at which the outer diameter of the leading end of the glass base material was 110 mm. Elongation was performed after setting, on the elongating apparatus, the glass base material, which had the cut face with a suspension dummy having an outer diameter of 60 mm welded thereto by using a glass lathe.

Example 14: The transparent-tapered-glass-section side of the glass base material was cut at a position at which the outer diameter of the leading end of the glass base material was 110 mm. Elongation was performed after setting, on the elongating apparatus, the glass base material, which had the cut face with a suspension dummy having an outer diameter of 70 mm welded thereto by using a glass lathe.

In each of examples 4-14, the outer diameters of product portions were −0.3 mm to +0.6 mm in comparison with the target elongation diameter, i.e., a small amount of outer diameter variation was observed, and small amounts of curvature of 0.5 mm/m to 1.7 mm/m were also observed.

In example 8, however, when removing product portions after elongation, a crack occurred in a portion of the transparent tapered glass section in the vicinity of the site to which the suspension dummy was welded, and the removing of the product was made unstable, thereby increasing the burden on the operator. The portion to which the suspension dummy was welded had a large outer diameter of 150 mm, so it is considered that the heating of the vicinity of the connection performed by the glass lathe was insufficient, with the result that the crack easily occurred due to a remaining strain. Thus, it can be said to be more preferable that the outer diameter of the cut face of the transparent tapered glass section be 140 mm or less.

In example 9, when removing product portions after elongation, a crack occurred in the suspension dummy welded to the transparent tapered glass section, and the removing of the product was made unstable, thereby increasing the burden on the operator. The suspension dummy had an excessively small diameter of 20 mm, so it is considered that the crack was made from an invisibly minute flaw due to a load upon elongation or ambient heat.

In example 14, there was no problem with the shape of the product or the stability of the removing process, but a problem with cost was incurred due to the suspension dummy having a large outer diameter of 70 mm. The larger the outer diameter of a suspension dummy is, the higher the unit price of the suspension dummy is. Hence, when a multitude of suspension dummies need to be used, the cost for preparing the suspension dummies will increase. Hence, in terms of cost, a suspension dummy having an outer diameter greater than 60 mm is not preferable.

According to the examples described above, it can be said to be more preferable that the outer diameter of the site of a suspension dummy that is welded to the cut face of a transparent tapered glass section is 30 mm or more and 60 mm or less.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: Heater
2: Heat insulation material
3: Water-cooling chamber
4: Top chamber
5: Suspension shaft
6: Connection jig
7: Sending mechanism
8: Lower gas seal
9: Guide roller
10: Pulling roller (Upper pulling roller)
11: Pulling roller (Lower pulling roller)
12: Glass base material
13: Suspension dummy
14: Pulling dummy
15: Opaque section
16: First tapered section
17: Second tapered section
18: Body section
19: End face
100: Elongating apparatus

What is claimed is:

1. An elongating method for elongating a glass base material by heating the same while moving the same downward within an elongating apparatus, the glass base material including a transparent tapered section, wherein the transparent tapered section is located at an upper end of the glass base material and has an end face to which a suspension dummy formed from a glass pole is welded, the elongating method comprising steps for:
   starting elongating of the glass base material by heating the same, starting from a lower-end side thereof, by causing the glass base material to pass through a range of a heating furnace within the elongating apparatus in which a preset elongating process temperature or higher is maintained; and
   after the transparent tapered section enters the range, ending the elongating of the glass base material once the following condition is met:

$(X/2)<Y<\{(X/2)+Z\}$, where X is a length of the range in an up-down direction of the elongating apparatus [mm], Y is a length of an area extending from a central position in the range in the up-down direction to the end face [mm], and Z is a length of the transparent tapered section in the up-down direction [mm].

2. The elongating method of claim 1, wherein
   $D2 \leq D1 < 140$ [mm] is satisfied, where D1 is an outer diameter of the end face [mm], and D2 is an outer diameter of the suspension dummy on a side of the end face [mm].

3. The elongating method of claim 2, wherein
   the outer diameter of the suspension dummy on the side of the end face is 30 mm or more and 60 mm or less.

4. The elongating method of claim 3, wherein
   the glass base material contains quartz glass, and the preset elongating process temperature is 1900° C.

5. The elongating method of claim 2, wherein
   the glass base material contains quartz glass, and the preset elongating process temperature is 1900° C.

6. The elongating method of claim 1, wherein
   an outer diameter of the suspension dummy on a side of the end face is 30 mm or more and 60 mm or less.

7. The elongating method of claim 6, wherein
   the glass base material contains quartz glass, and the preset elongating process temperature is 1900° C.

8. The elongating method of claim 1, wherein
   the glass base material contains quartz glass, and the preset elongating process temperature is 1900° C.

9. An elongating system for elongating a glass base material by heating the same while moving the same downward within an elongating apparatus, comprising:
   the glass base material including a transparent tapered section, wherein the transparent tapered section is located at an upper end of the glass base material and has an end face to which a suspension dummy formed from a glass pole is welded,
   the elongating apparatus including a heating furnace; wherein
   the elongating apparatus is configured to:
   start elongating of the glass base material by heating the same, starting from a lower-end side thereof, by causing the glass base material to pass through a range of the heating furnace within the elongating apparatus in which a preset elongating process temperature or higher is maintained, and
   after the transparent tapered section enters the range, end the elongating of the glass base material once the following condition is met:

$(X/2)<Y<\{(X/2)+Z\}$, where X is a length of the range in an up-down direction of the elongating apparatus [mm], Y is a length of an area extending from a central position in the range in the up-down direction to the end face [mm], and Z is a length of the transparent tapered section in the up-down direction [mm].

* * * * *